(12) United States Patent
Oikarinen et al.

(10) Patent No.: US 8,037,160 B2
(45) Date of Patent: *Oct. 11, 2011

(54) METHOD AND DEVICE ARRANGEMENT FOR MANAGING A USER APPLICATION/DEVICE MANAGEMENT SERVER/CLIENT DEVICE ENVIRONMENT

(75) Inventors: Jarkko Oikarinen, Oulunsalo (FI); Lasse Koskela, Oula (FI)

(73) Assignee: Capricode Oy, Oulu (FI)

( * ) Notice: Subject to any disclaimer, the term of this patent is extended or adjusted under 35 U.S.C. 154(b) by 685 days.

This patent is subject to a terminal disclaimer.

(21) Appl. No.: 11/484,807

(22) Filed: Jul. 11, 2006

(65) Prior Publication Data
US 2007/0038699 A1    Feb. 15, 2007

(30) Foreign Application Priority Data
Jul. 12, 2005  (FI) ...................................... 20055405

(51) Int. Cl.
*G06F 15/177* (2006.01)
(52) U.S. Cl. ...................................... 709/220; 709/217
(58) Field of Classification Search .................. 709/217, 709/220
See application file for complete search history.

(56) References Cited

U.S. PATENT DOCUMENTS

| | | | |
|---|---|---|---|
| 5,845,090 A | * 12/1998 | Collins et al. | 709/221 |
| 5,860,012 A | * 1/1999 | Luu | 717/175 |
| 6,076,099 A | * 6/2000 | Chen et al. | 709/202 |
| 6,167,567 A | * 12/2000 | Chiles et al. | 717/173 |
| 2003/0204640 A1 | 10/2003 | Sahinoja et al. | |
| 2004/0098715 A1 | 5/2004 | Aghera et al. | |

FOREIGN PATENT DOCUMENTS

| | | |
|---|---|---|
| EP | 1168711 A1 | 1/2002 |
| WO | WO 2004/038546 A2 | 5/2004 |
| WO | WO 2004/061615 A2 | 7/2004 |
| WO | WO 2005/060388 A2 | 7/2005 |

* cited by examiner

*Primary Examiner* — Joon H Hwang
*Assistant Examiner* — Joel Mesa
(74) *Attorney, Agent, or Firm* — Volpe and Koenig, P.C.

(57) ABSTRACT

The invention relates to a method and data transfer arrangement for executing consecutive instructions in a client device (21) in a mobile user application—device management server—client device environment (23, 22, 21). The invention also relates to an instruction execution module utilized in the implementation of the method. In the procedure according to the invention, the user application (23) forms the instructions to be executed in the client device (21) into an instruction sequence (200), which is transmitted to the device management server (22) controlling the client device (21). The instruction execution module in the device management server breaks up the instruction sequence into command sequences and control structures. The command sequences are executed in the client device (21). The conditional commands belonging to the instruction sequence, specified by the control structures, are executed by the instruction execution module individually, without the help of the user application. The device management server sends a message describing the success of the execution of the instruction sequence to the user application.

16 Claims, 3 Drawing Sheets

METHOD AND DEVICE ARRANGEMENT FOR MANAGING A USER APPLICATION/DEVICE MANAGEMENT SERVER/CLIENT DEVICE ENVIRONMENT

TECHNICAL FIELD OF THE INVENTION

The invention relates to a method for executing consecutive instructions in a client device in a mobile User Application/Device Management Server/Client Device environment. The invention also relates to a data transfer arrangement used in the implementation of the method, an instruction execution module in the device management server and a computer program product by which the instruction execution module can be implemented.

BACKGROUND OF THE INVENTION

The management of information in decentralized information networks is important. This is especially true in the management of information and software contained by various mobile devices. Such management of information and files is generally called Device Management. Device Management has the following characteristics, for example: It enables one user application, terminal device or server to remote control at least one other device. It also enables complementing a program or a part thereof in a terminal device by new information or parts of a program, which are located in another device. The validity of licenses, or rights of use, of the software is also managed by it. Device Management may also comprise matters related to Digital Right Management.

Open Mobile Alliance (OMA) has published specifications, which concern the updating and maintenance of software in mobile devices. The specifications OMA DM (Device Management) and OMA DS (Data Synchronization) describe some possible ways of implementing data transfer and real-time maintenance of the files of mobile devices. These specifications also describe the SyncML protocol (Synchronization Markup Language) and how it is utilized.

FIG. 1 presents an exemplary signal chart of the prior art operation in a User Application/Device Management Server/Client Device environment according to the OMA standard. The transfer of instructions and data between the Client Device 11, the Device Management Server 12 and the User Application 13 requires a large amount of message exchange between them. The Device Management Server mentioned below in this description is also referred to by the general name server. The user application 13 can be located either in the server 12 or some third device, which has the right to implement changes in the client device 11. When the user application 13 is located in a third device, the data transfer connection between the user application 13 and the device management server 12 can be a wireless data transfer connection.

Performing a procedure required by a user application 13 in the client device 11 may require executing a number of separate instructions in a certain order. The responsibility for the execution of the instructions lies with the user application 13, which implements the instructions in the client device 11 through the server 12. The client device 11 implements one instruction received at a time and reports on the result to the server 12, which gave the instructions and which transmits the information to the user application 13.

The message exchange can be like the following, for example. Message exchange is started by a user application 13. In the example of FIG. 1, the user application 13 requires the performance of certain procedures in the client device 11. The procedures are implemented by sending a certain number of instructions, like m instructions in the example of FIG. 1.

The user application 13 sends the first instruction, Ref. 14a, to the server 12. The server transmits the instruction it has received to the client device 11 for execution, Ref. 14b. After the execution of the instruction, the client device 11 sends the execution information, Ref. 15a, of the result of the operation back to the server 12, which transmitted the instruction. The server 12 transmits the performance information it has received further to the user application 13, Ref. 15b. If the first instruction has been executed successfully, the user application 13 sends the next instruction to the server 12, Ref. 16a. The server 12 transmits the instruction it has received further to the client device 11 for performance, Ref. 16b. The client device 11 executes the second instruction it has received and sends execution information of the execution of the second instruction back to the server 12. The server 12 transmits the execution information it has received in the manner described above to the user application 13.

The user application 13 must always check the content of each piece of execution information it has received, in order to be able to proceed in the instruction sequence to the execution of the next instruction. The execution information received from the client device 11 may thus also result in that the user application 13 must make a decision on which instruction is transmitted to the client device next.

The user application 13 may also report to the requester of the instruction sequence, which may be a physical client, after each instruction executed.

The message exchange lasts until the user application 13 sends the last instruction belonging to the sequence of instructions through the server 12 to the client device 11, Refs. 17a and 17b. The execution information of the last instruction is returned by message 18a to the server 12, which transmits it further to the user application, Ref. 18b. If the message indicates that the execution of the last instruction was also successful, the message exchange between the user application 13, server 12 and client device 11 is stopped.

A central problem in wireless data transfer is the limited data transfer channel used. The prior art conversation between the user application, server and client device for executing the sequence of instructions consumes the limited data transfer resources of the wireless system unnecessarily.

SUMMARY OF THE INVENTION

An aspect of the invention is to provide a new method and device arrangement, by the utilization of which the sequence of instructions in the client device controlled by the user application need not be implemented like a conversation in its entirety, whereby the data transfer resources of the wireless system are saved.

The aspect of the invention is achieved by an arrangement, in which the device management server comprises an instruction performance module, which can receive an instruction sequence from the user application as one entity and independently execute the instructions contained by it in the client device without additional guidance given by the user application.

The invention has the advantage that data transfer between the client device and the user application taking place over the wireless links can be reduced.

Furthermore, the invention has the advantage that the data transfer capacity of the wireless link becoming free can be assigned for use by the utility applications of other devices connected to the same wireless data transfer network.

The method according to the invention for executing consecutive instructions in a client device in a mobile user application—device management server—client device environment is characterized in that the instruction sequence transmitted to the device management server also comprises control structures containing conditional commands, which are executed by the instruction execution module of the device management server.

The data transfer arrangement according to the invention for executing consecutive instructions in a client device in a mobile user application—device management server—client device environment is characterized in that the instruction sequence transmitted to the device management server also comprises control structures containing conditional commands, which are arranged to be executed by the instruction execution module of the device management server.

The instruction execution module of a device management server operating in a mobile user application—device management server—client device environment is characterized in that it comprises program means for receiving an instruction sequence transmitted by the user application program means for breaking up the instruction sequence into individual instructions, which are either command sequences or control structures program means for controlling the execution of the command sequences in the client device program means for executing the control structures in the device management server program means for drawing up a message describing the success of the execution of the instruction sequence, and program means for sending a message describing the success to the user application.

The computer program product according to the invention for achieving an instruction execution module of a device management server operating in a mobile user application—device management server—client device environment is characterized in that the computer program product comprises computer readable code means for receiving an instruction sequence transmitted by the user application computer readable code means for breaking up the instruction sequence into individual instructions, which are either command sequences or control structures computer readable code means for controlling the execution of the command sequences in a client device computer readable code means for executing the control structures in a device management server computer readable code means for drawing up a message describing the success of the execution of the instruction sequence, and computer readable code means for sending a message describing the success to the user application.

Some preferred embodiments of the invention are presented in the dependent claims.

The basic idea of the invention is the following: The device management server is provided with an instruction execution module, which can independently execute the command sequences and the control structures according to the invention, such as IF, THEN, ELSE, WHILE, DO-UNTIL, FOREACH or CALL in the instruction sequence transmitted to it by the user application. In the method according to the invention, the user application thus sends only the instruction sequence drawn up by it to the device management server, in which the instruction execution module controls the operations according to the instruction sequence in the actual client device. By using the control structures, the instruction execution module according to the invention can also solve independently the situations in which some conditions have been set for the execution result of an individual instruction. By the procedure according to the invention it is thus possible to reduce the need for data transfer between the user application and the client device significantly compared to the prior art instruction-by-instruction conversation.

Further scope of applicability of the present invention will become apparent from the detailed description given hereafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION

Figure 1:
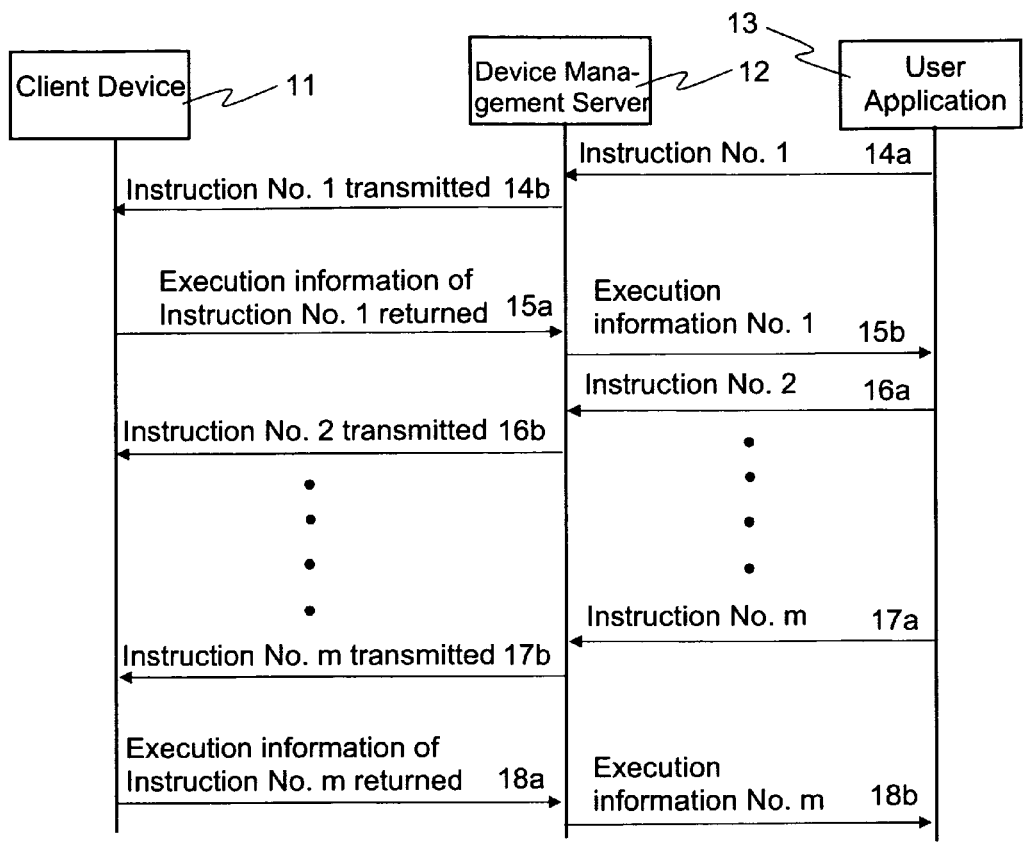
FIG. 1 shows a prior art device management procedure as an exemplary signal chart.

FIG. 1 was explained above in connection with the description of the prior art.

Figure 2B:
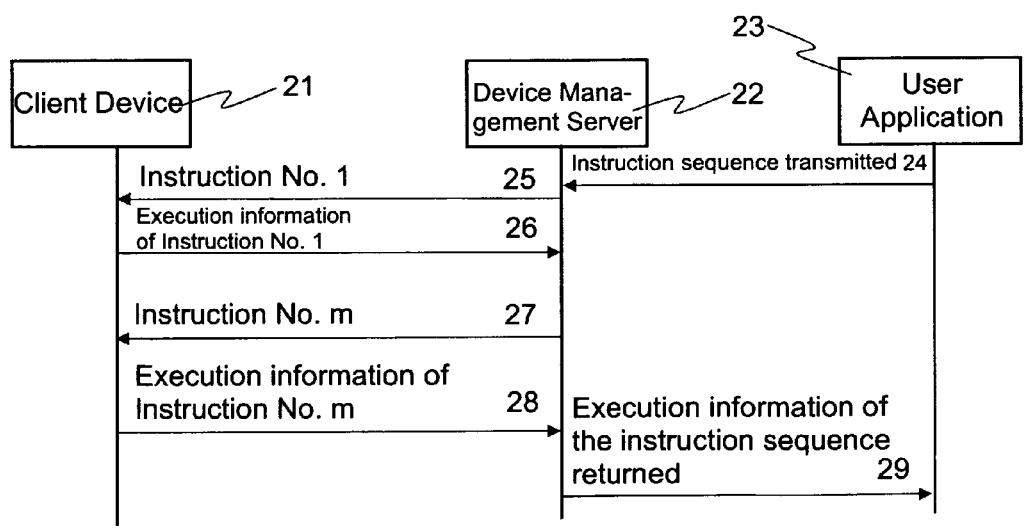
FIG. 2b shows the device management procedure according to the invention as an exemplary signal chart.
Figure 2A:
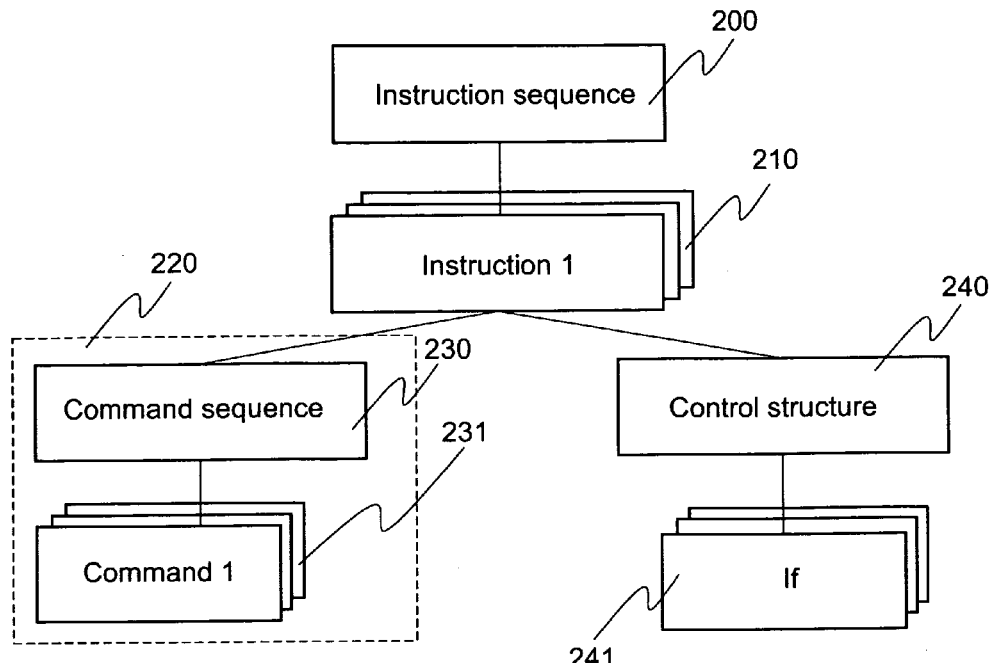
FIG. 2a shows how the control structures are associated with the instruction sequences in the procedure according to the invention.

FIG. 2a presents a hierarchical structure, which is utilized in the method and device arrangement according to the invention. The instruction sequence 200 includes all the instructions, which the user application 23 orders to be executed in the client device 21. The instruction sequence 200 includes a number of separate instructions 210. A single instruction 210 can be either a command sequence 230 or a control structure 240. The command sequence 230 consists of separate commands 231 to be executed in the client device 21, and there may be a plurality of them. The prior art SyncML protocol 220 comprises the command sequence—command entity shown in FIG. 2a.

In the operation according to the invention, control structures 240 are utilized in the device management server 22 in addition to the command sequences 230. The control structures 240 advantageously include the following conditional commands as single commands 241 or combinations thereof: IF, THEN, ELSE, WHILE, DO-UNTIL, FOREACH and CALL. By using the control structures 240, a device management server 22 according to the invention can independently perform prior art control measures that belonged to the user application 23.

FIG. 2b shows an exemplary signal chart of a device management procedure according to the invention, in which the change of the data structure ordered by the user application 23 is implemented in the client device 21. Ref. 23 denotes a user application on the demand of which the operation is implemented. Ref. 22 denotes a device management server under the control of which the change operation mentioned above is performed in the client device 21.

In the procedure according to the invention, the user application 23 forms single instructions required in the performance of the operation into an instruction sequence 22, which it delivers to the server 22, Ref. 24.

In FIG. 2b, the device management server 22 starts controlling the client device 21 by instruction No. 1, Ref. 25, belonging to the instruction sequence 200. Arrow 26 indicates the feedback information given by the client device 21, describing the execution of instruction No. 1. The operation proceeds instruction by instruction, controlled by the instruction execution module of the device management server 22 up to the last instruction No. m, Ref. 27, if there is no comparison after the execution associated with the instruction and if each instruction has been executed successfully. When all the instructions of the instruction sequence have been executed in the client device 21, the client device 21 sends the feedback information related to the last instruction No. m, Ref. 28, to the device management server 22. Then the device management server 22 states that it has successfully performed the task assigned to it by the user application 23. The server 22 transmits this information further to the user application 23.

If the instruction sequence 200 received from the user application 23 includes a comparison after execution and a decision on the method of proceeding taken on the basis of that, the control structures 240 are utilized in the device management server 22 in the instruction execution module according to the invention. Then the instruction execution module of the device management server 22 takes the decision on which command sequence 230 or command 231 is executed next, on the basis of the feedback information received by it.

The device management server 22 comprises an instruction execution module according to the instruction, which has advantageously been implemented by program means installed in the server 22. When the server 22 has received the instruction sequence 200 transmitted by the user application 23, it controls the execution of the command sequences 230 in the client device 21. In addition, the instruction execution module according to the invention executes the conditional control structures belonging to the instruction sequence 200. The conditional, executable commands belonging to the control structures include, for example: IF, THEN, ELSE, WHILE, DO-UNTIL, FOREACH and CALL in various combinations. The instruction execution module can execute all the instructions and control structures included in the instruction sequence in the specified order and extent.

If an instruction ordered to be executed results in a state from which it is impossible to proceed by the instruction execution module according to the invention, the instruction execution module generates a fault report of the situation. The fault report is sent to the user application 23.

If the instruction execution module according to the invention succeeds in executing the instruction sequence in the manner specified by the user application 23, the instruction execution module of the device management server 22 sends a message describing the success to the user application, Ref. 29.

If the instruction sequence ordered by the user application 23 cannot be executed in the specified manner, the instruction execution module of the device management server 22 sends information about it to the user application, Ref. 29.

The transmission of only one instruction sequence 200 from the user application 23 to the device management server 22, Ref. 24, and the feedback message caused by it, Ref. 29, is shown in FIG. 2b. However, the invention is not limited to only one instruction sequence to be transmitted, but Ref. 24 in the figure may comprise a number of separate instruction sequences, whereby a conversation is created between the device management server 22 and the user application 23. In addition, it is possible that the user application 23 first sends a number of instruction sequences consecutively, and only after receiving the last instruction sequence, the device management server 22 executes the instruction sequences it has received and gives a feedback message about them, either separately about each instruction sequence or about all of them together.

Figure 3A:
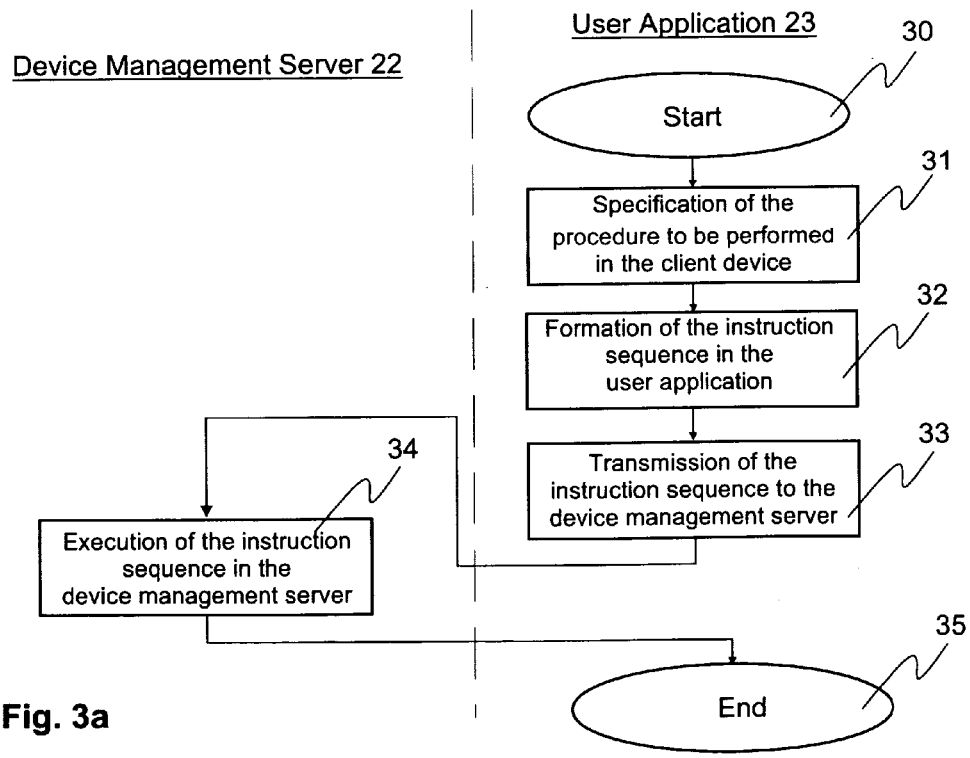
FIG. 3a shows the main steps of the device management procedure according to the invention as an exemplary flow chart.

FIG. 3a is an exemplary flow chart of the main steps of the device management procedure according to the invention in different functional parts of the device arrangement. The process starts in step 30, in which the user application 23 specifies a change measure to be performed in a certain client device 21, which as implemented causes a change in a data structure of the above mentioned client device 21.

In step 31, the user application 23 specifies the measures required in the change process. It also specifies by what kind of instructions to be executed in the client device 21 the required change measures can be implemented. The user application 23 forms the specified instructions into an instruction sequence, step 32, which is transmitted in step 33 to a device management server 22 connected to the client device.

In the device management server 22, the instruction sequence is directed to an instruction execution module according to the invention, which recognizes the instruction sequence and advantageously breaks it up into single instructions and further into command sequences and control structures. These are further broken up into commands and conditional commands.

In step 34, the instruction execution module of the device management server 22 sends a command sequence or a single command to the client device 21, in which the commands are executed.

Step 35 of FIG. 3a is reached when the last instruction in the instruction sequence has been executed. If all the instructions included in the instruction sequence received have been successfully executed, in step 35 the device management server 22 sends a report of the successful execution of the instruction sequence to the user application 23, which transmitted the instruction sequence.

Another possible way of arriving at step 35 is that the instruction execution module according to the invention, belonging to the device management server, finds that the client device 21 cannot execute an instruction of the instruction sequence. In that case, a fault report is generated in step 35 in the device management server 22. The fault report is sent to the user application 23, which transmitted the instruction sequence.

Figure 3B:
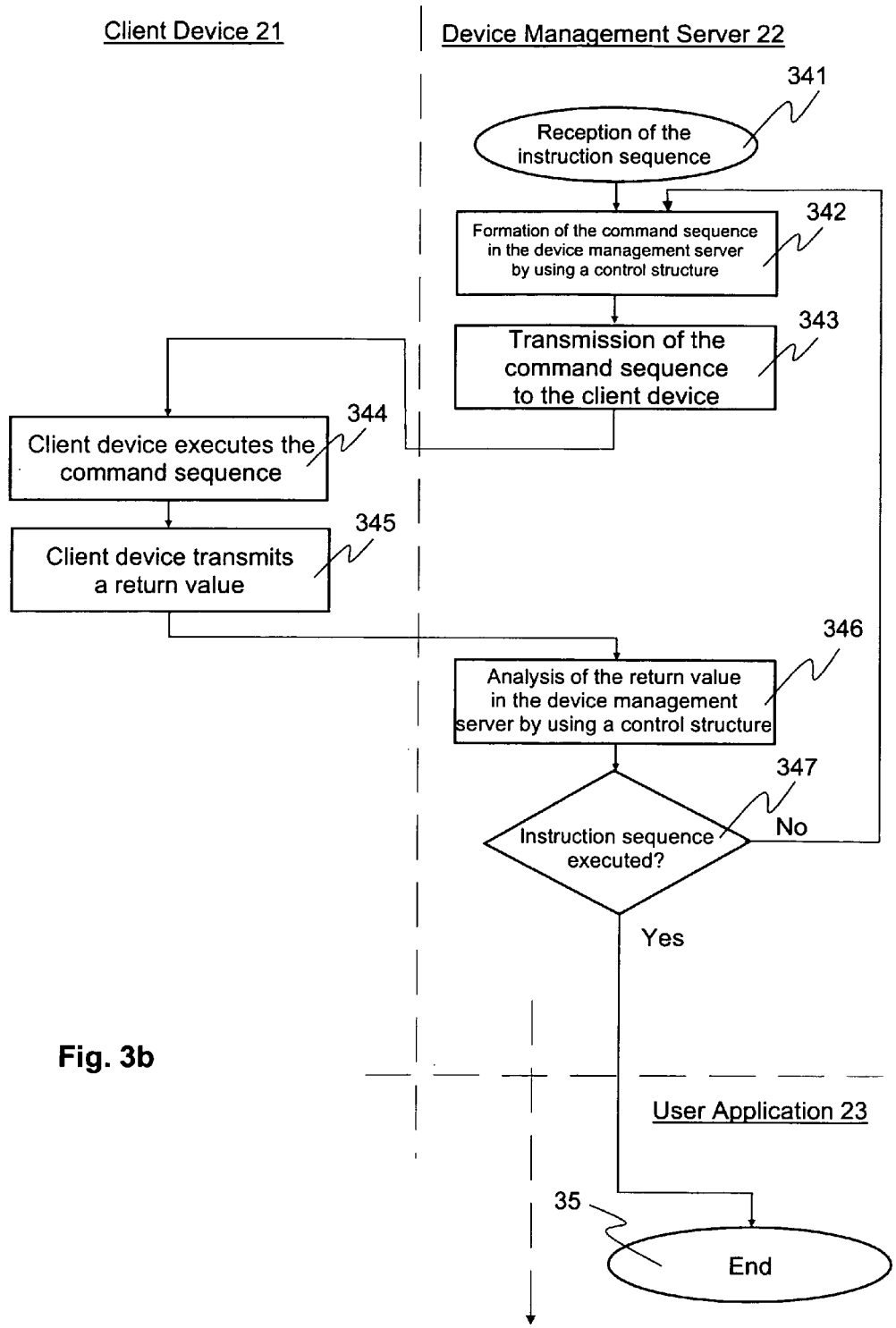
FIG. 3b presents the utilization of the control structures belonging to the device management procedure according to the invention as an exemplary flow chart.

The substeps of the execution of the instruction sequence 200 of step 34 in FIG. 3a are shown in FIG. 3b. In step 341, the device management server 22 receives the instruction sequence 200 formed by the user application 23.

In step 342, the instruction execution module of the device management server breaks up the instruction sequence into instructions 210 and further into command sequences 230 and control structures 240. The instruction execution module forms the next command sequence 230 to be transmitted to the client device 21. When forming the new command sequence 230, the instruction execution module preferably utilizes the control structures 240 according to the invention.

In step 343, the formed command sequence 230 is transmitted to the client device 21. In step 344, the client device 21 executes the command sequence it has received. In step 345, the client device 21 transmits the return value of the execution of the command sequence to the device management server 22.

In step 346, the instruction execution module of the device management server 22 analyzes the return value it has received. Utilizing the control structures, the instruction execution module advantageously forms the next command sequence to the client device 21 or a report of the successful execution of the instruction sequence to the user application 21.

In step 347, it is examined which alternative it is. If it is found in step 347 that some of the instructions specified for the client device 21 have not yet been executed, alternative "No", the procedure returns to step 342, in which the instruction execution module forms the next command sequence to be transmitted to the client device 21.

If the instruction sequence 200 has been executed in its entirety, alternative "Yes", the procedure arrives at step 35 described above, in which a report of the execution of the instruction sequence is sent to the user application 23.

A feature that is essential with regard to the implementation of the invention is the instruction execution module in the device management server 22. The instruction execution module can advantageously be implemented by program means, which have been saved in the device management server. All the measures to be performed in the method according to the invention can thus advantageously be performed in the processor unit of the device management server as controlled by the instruction execution module. The instruction execution module according to the invention can be implemented by some prior art programming language.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A device management method for changing a data structure in a separate wireless mobile client device by executing consecutive instructions in the wireless mobile client device, the method comprising:
   forming at least one device management instruction sequence by a user application residing in a second electronic device, wherein the device management instruction sequence comprises:
      command sequences including single commands, and;
      control structures including conditional commands to be executed in the mobile client device;
   transmitting the formed device management instruction sequence from the user application residing in the second electronic device to a device management server residing in a third electronic device; and
   executing the command sequences and control structures of the device management instruction sequence by remote control of the device management server in the separate wireless mobile client device for changing the data structure in the wireless mobile client device.

2. The method according to claim 1, further comprising:
   directing the separate mobile client device to execute the instructions belonging to the device management instruction sequence one instruction at a time by an instruction execution module of the device management server, and;
   sending a message describing the success of the execution of the device management instruction sequence from the instruction execution module of the device management server to the user application.

3. The method according to claim 2, wherein the transmitting includes the user application transmitting the device management instruction sequence as one entity to the device management server.

4. The method according to claim 3, wherein said device management instruction sequence comprises at least one control structure, which includes one or more of the following conditional commands: IF, THEN, ELSE, WHILE, DO-UNTIL, FOREACH or CALL.

5. The method according to claim 2, wherein said device management instruction sequence comprises at least one control structure, which includes one or more of the following conditional commands: IF, THEN, ELSE, WHILE, DO-UNTIL, FOREACH or CALL.

6. The method according to claim 1, wherein said device management instruction sequence comprises at least one control structure, which includes one or more of the following conditional commands: IF, THEN, ELSE, WHILE, DO-UNTIL, FOREACH or CALL.

7. A wireless device management arrangement comprising:
   wireless mobile client devices;
   a second electronic device comprising a user application; and
   a third electronic device comprising a device management server that includes a processor unit;
   in which wireless device management arrangement for executing device management instructions in a separate mobile client device:
   the user application residing in the second electronic device is configured to:
      form at least one device management instruction sequence, the device management instruction sequence comprising:
         command sequences with single commands; and
         control structures containing conditional commands; and
      transmit the formed device management instruction sequence to the device management server residing in the third electronic device; and
   the device management server device is configured to control execution of said device management instruction sequence in a processor unit of the separate wireless mobile client device for changing the data structure in the separate mobile client device.

8. The device management arrangement according to claim 7, wherein:
   the device management instruction sequence is configured to be transmitted from the user application to the device management server;
   an instruction execution module of the device management server is configured to control the execution of the device management instruction sequence in the mobile client device one instruction at a time, and;
   the instruction execution module of the device management server is configured to send a message describing the success of the execution of the device management instructions to the user application.

9. The device management arrangement according to claim 8, wherein the user application is configured to transmit the device management instruction sequence as one entity to the device management server.

10. The device management arrangement according to claim 9, wherein said device management instruction sequence comprises at least one control structure, which contains one or more of the following conditional commands: IF, THEN, ELSE, WHILE, DO-UNTIL, FOREACH or CALL.

11. The device management arrangement according to claim 8, wherein said device management instruction sequence comprises at least one control structure, which contains one or more of the following conditional commands: IF, THEN, ELSE, WHILE, DO-UNTIL, FOREACH or CALL.

12. The device management arrangement according to claim 7, wherein said device management instruction sequence comprises at least one control structure, which contains one or more of the following conditional commands: IF, THEN, ELSE, WHILE, DO-UNTIL, FOREACH or CALL.

13. A device management server comprising a processor unit and an instruction execution module which comprises:
   means for receiving a device management instruction sequence transmitted by a user application residing in a second electronic device for changing a data structure in a separate wireless mobile client device;
   means for breaking up the device management instruction sequence into single instructions, which are either command sequences or control structures;
   means for controlling the execution of the command sequences in the separate wireless mobile client device;
   means for executing the control structures in the processor unit of the device management server;
   means for drawing up a message describing the success of the execution of the device management instruction sequence, and
   means for sending a message describing the success to the user application residing in the second electronic device.

14. The device management server according to claim 13, which further comprises means for executing conditional commands IF, THEN, ELSE, WHILE, DO-UNTIL, FOREACH or CALL belonging to the control structures, if the conditional commands are included in the device management instruction sequence transmitted by the user application.

15. The device management server according to claim 13, where the processor unit is configured to execute a set of instructions comprising:
   a receiving code segment for receiving a device management instruction sequence transmitted by a user application residing in the second electronic device;
   a breaking up code segment for breaking up the device management instruction sequence into single instructions, which are either command sequences or control structures;
   a controlling code segment for controlling the execution of the command sequence in a separate wireless mobile client device;
   an executing code segment for executing the control structures in a processor unit of the device management server;
   a drawing up code segment for drawing up a message describing the success of the execution of the device management instruction sequence, and;
   a sending code segment for sending a message describing the success to the user application.

16. The device management server according to claim 15, where the processor unit is further configured to execute a second executing code segment of the conditional commands IF, THEN, ELSE, WHILE, DO-UNTIL, FOREACH or CALL belonging to the control structures, if they the conditional commands are included in the device management instruction sequence transmitted by the user application.

* * * * *

UNITED STATES PATENT AND TRADEMARK OFFICE
CERTIFICATE OF CORRECTION

| | |
|---|---|
| PATENT NO. | : 8,037,160 B2 |
| APPLICATION NO. | : 11/484807 |
| DATED | : October 11, 2011 |
| INVENTOR(S) | : Oikarinen et al. |

It is certified that error appears in the above-identified patent and that said Letters Patent is hereby corrected as shown below:

IN THE CLAIMS:

In claim 16, at column 10, line 29, delete the word "they."

Signed and Sealed this
Twenty-seventh Day of December, 2011

David J. Kappos
*Director of the United States Patent and Trademark Office*